United States Patent
Kim

(10) Patent No.: US 9,459,657 B2
(45) Date of Patent: Oct. 4, 2016

(54) PORTABLE COMPUTING DEVICE DOCKING APPARATUS

(71) Applicant: Samsung Electronics Co., Ltd, Suwon-si, Gyeonggi-do (KR)

(72) Inventor: Se-yun Kim, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 147 days.

(21) Appl. No.: 14/325,461

(22) Filed: Jul. 8, 2014

(65) Prior Publication Data

US 2015/0120980 A1   Apr. 30, 2015

(30) Foreign Application Priority Data

Oct. 25, 2013 (KR) .................. 10-2013-0127659

(51) Int. Cl.
   *H05K 5/00*   (2006.01)
   *G06F 1/16*   (2006.01)
   *G06F 3/02*   (2006.01)

(52) U.S. Cl.
   CPC ........... *G06F 1/1632* (2013.01); *G06F 1/1669* (2013.01); *G06F 1/1679* (2013.01); *G06F 1/1681* (2013.01); *G06F 3/0202* (2013.01)

(58) Field of Classification Search
   CPC .. G06F 1/1632; G06F 1/1616; G06F 1/1669; G06F 1/181
   See application file for complete search history.

(56) References Cited

U.S. PATENT DOCUMENTS

2013/0155583 A1*  6/2013  Yang .................... G06F 1/1626
                                                                          361/679.01

* cited by examiner

*Primary Examiner* — Robert J Hoffberg
*Assistant Examiner* — Hung Dang
(74) *Attorney, Agent, or Firm* — Staas & Halsey LLP

(57) ABSTRACT

A portable computing device docking apparatus includes an input unit to input a user command, a mounting unit disposed on one side of the input unit, into which one end portion of a portable computing device is separately inserted, and a hinge unit to interconnect the input unit and the mounting unit, and selectively lock and release the portable computing device according to an angle formed by the portable computing device mounted on the mounting unit and the input unit.

18 Claims, 15 Drawing Sheets

PORTABLE COMPUTING DEVICE DOCKING APPARATUS

CROSS-REFERENCE TO RELATED APPLICATIONS

This application claims priority under 35 U.S.C. §119 from Korean Patent Application No. 10-2013-0127659, filed on Oct. 25, 2013, in the Korean Intellectual Property Office, the disclosure of which is incorporated herein by reference in its entirety.

BACKGROUND OF THE INVENTION

1. Field of the Invention

The present general inventive concept generally relates to a portable computing device docking apparatus, and more particularly, to a portable computing device docking apparatus including an input unit and a portable computing device detachably mounted on the input unit, where a user command is input through the input unit to control the portable computing device.

2. Description of the Related Art

In portable computing devices, for example, tablet personal computers (PCs) having a touch function, character input or the like can be freely performed without a separate accessory device.

However, when a user needs to input large amounts of characters to the tablet PC, for word processing or other purposes, due to a limit to input the characters to a screen through a touch method, the tablet PC is used in a state in which the table PC is docked with a docking apparatus including a separate keyboard.

With regard to portable computing device docking apparatuses, it is necessary to include a structure, by which a user may conveniently manipulate an interface between the table PC and the docking apparatus and change a mounting/detachment status of the tablet PC.

Various types of mountable/detachable structures used in the portable computing device docking apparatuses have been developed and released including a conventional locking structure. In the conventional locking structure, when a button provided around a mounting unit, on which the tablet PC of the docking apparatus is mounted, is pressed or pushed to one direction, a pair of hooks is interlocked with a separate connection member, and moves from a locking groove formed in a lower end of the tablet PC to a locking release position.

To separate the tablet PC from the docking apparatus through the conventional locking structure, a user must consistently press or push the button to one direction through one hand, and, at the same time, separate the tablet PC from the docking apparatus by pulling the tablet PC to a direction away from the docking apparatus, that is, to an upward direction, through the other hand.

However, since the button has to be consistently pressed or pushed to one direction through one hand until the tablet PC is separated, it is not easy for the user to separate the tablet PC from the docking apparatus through the conventional locking structure. As such, the conventional locking structure causes aggravated inconvenience to the user with respect to the separation operation of the tablet PC.

SUMMARY OF THE INVENTION

The present general inventive concept provides a portable computing device docking apparatus capable of easily releasing locking of a portable computing device from a mounting unit through a user's operation of rotating the portable computing device to a predetermined angle.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a portable computing device docking apparatus, including an input unit to input a user command, a mounting unit disposed in one side of the input unit, and into which one end portion of a portable computing device is separately inserted, and a hinge unit to interconnect the input unit and the mounting unit, and selectively lock and release the portable computing device according to an angle formed by the portable computing device mounted on the mounting unit and the input unit.

The hinge unit may lock the portable computing device when the mounting unit is set to rotate in a first angle range, and release the locking of the portable computing device when the mounting unit is set to rotate in a second angle range exceeding an upper limit of the first angle range.

The hinge unit may include a fixing member fixed to the input unit; a connection member fixed to the fixing member and having a cam surface formed in one end thereof, a first hinge shaft inserted into the connection member and rotatably connected to the input unit, a second hinge shaft disposed coaxially with the first hinge shaft and fixed to the connection member, and a hooking part including a cam protrusion in cam contact with the cam surface, and to rotate with the mounting unit and slide along an axial direction of the second hinge shaft.

The hooking part may include a hook formed to be inserted into a locking groove of the portable computing device, and the hook may be set to be located in the locking groove in the first angle range, and set to a detachable location from the locking groove in the second angle range.

The cam surface may include a first section corresponding to the first angle range, and a second section corresponding to the second angle range.

The hooking part may be elastically supported to the second hinge shaft so that the cam protrusion is in close contact with the cam surface.

The mounting unit may be rotatably connected to the hinge unit, and the mounting unit may include a rear support part and a front support part to support a rear and a front of the portable computing device.

The hook part may be slidably guided to the rear support part, and rotate with the rear support part.

The hinge unit may further include a pressing part to maintain a rotation angel of the mounting unit in one side thereof.

The pressing part may include a plurality of elastic washers installed in the first hinge shaft; a first uneven part supported by the plurality of elastic washers, and to rotate with the first hinge shaft; and a second uneven part coupled to the fixing member and selectively mutually unevencoupled to and uneven-released from the first uneven part.

The hinge unit may be disposed in the left and right of the mounting unit in pairs.

The input unit may be a keyboard.

The foregoing and/or other features and utilities of the present general inventive concept can also be achieved by providing a docking apparatus that includes a first body, a second body detachably connected to the first body in a foldable manner such that an angle is formed between the first body and the second body, and a hinge unit disposed on the first body to selectively engage with the second body according to the angle formed between the first body and the second body.

The second body may be mounted to the first body when the angle is within a first angle range, and is separated from the first body when the angle is within a second angle range.

A lower limit of the second angle range may exceed an upper limit of the first angle range.

The hinge unit may include a connection member in a fixed position with respect to the first body, the connection member containing a cam surface including a first section corresponding to the first angle range and a second section corresponding to the second angle range.

The first section and the second section may be curved portions of the cam surface.

The docking apparatus may further include a mounting unit disposed on the first body to rotatably connect to the hinge unit and, according to the angle formed between the first body and the second body, to selectively receive the second body.

The hinge unit may include a hooking part including a hook to selectively insert into a locking groove of the second body according to the angle formed between the first body and the second body.

The hook of the hinge unit may be inserted in the locking groove when the angle between the first body and the second body is within the first angle range, and is separated from the locking groove when the angle is within the second angle range.

The second body may be detached from the first body when the angle exceeds a predetermined range.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
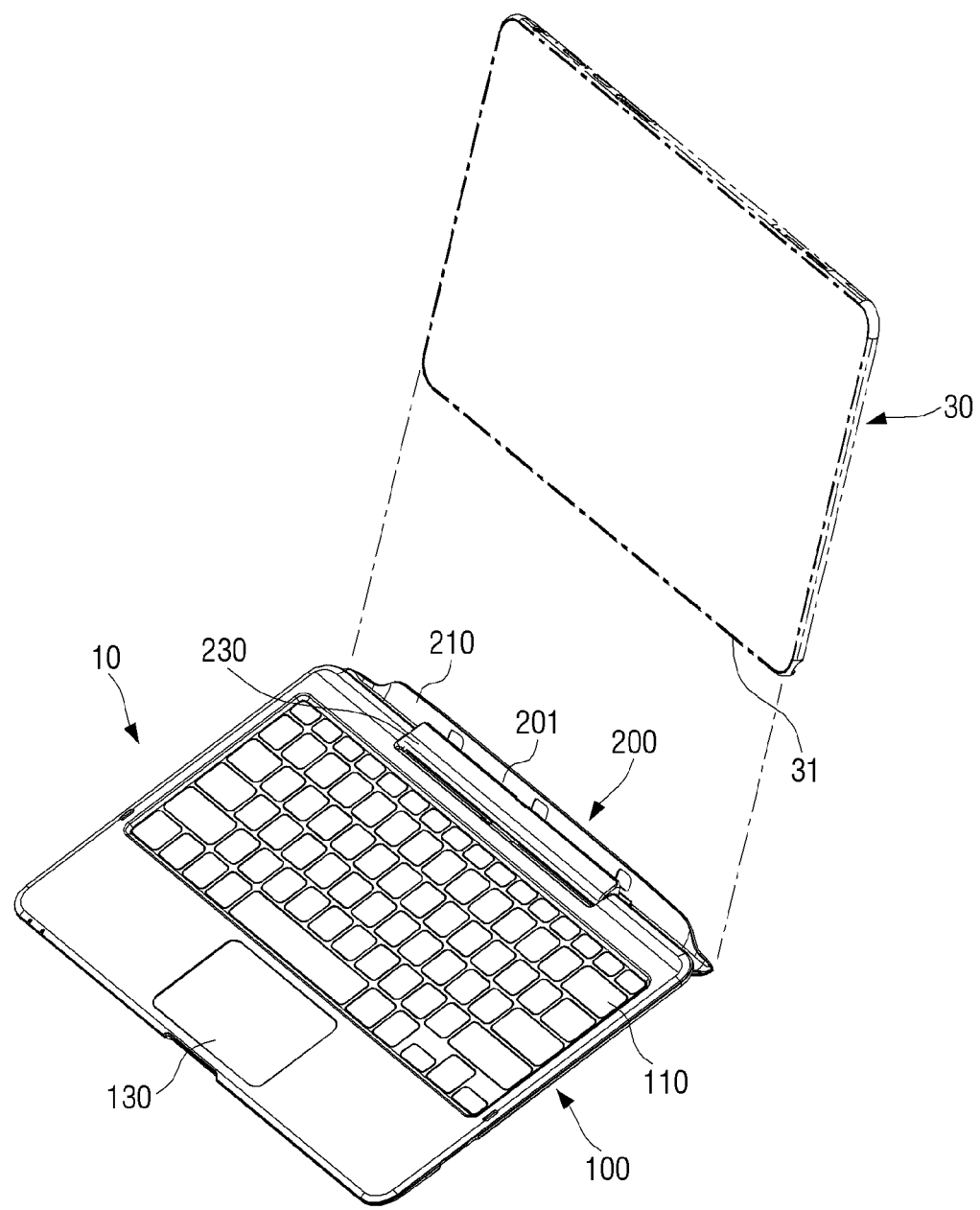
FIG. 1 is a perspective view illustrating a portable computing device docking apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
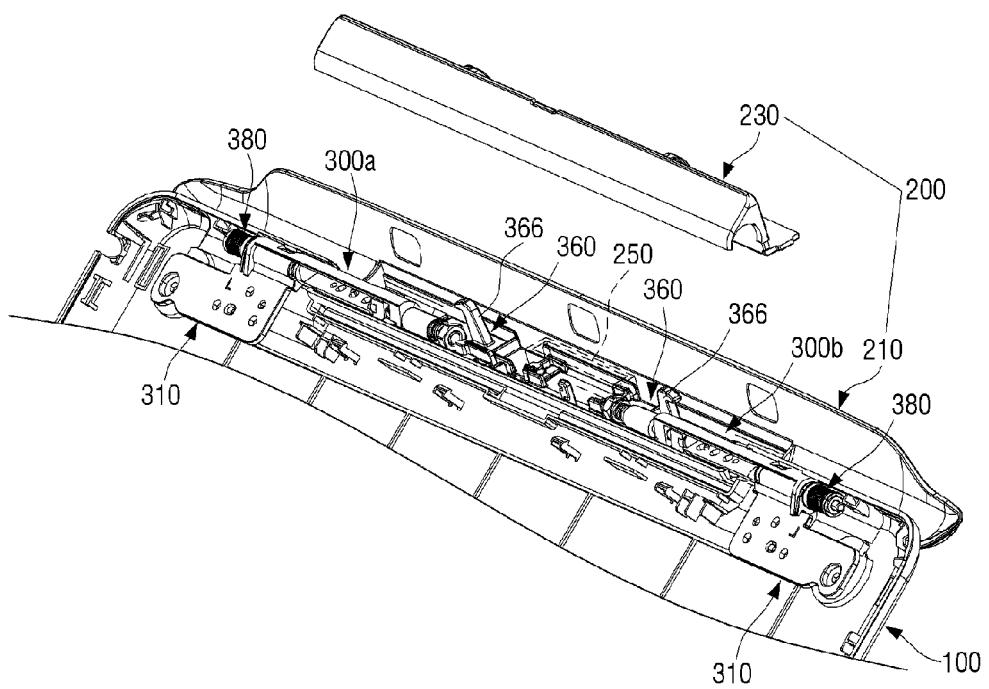
FIG. 3 is a perspective view illustrating a mounting unit installed in an input unit illustrated in FIG. 1.

Referring to FIG. 1, a portable computing device docking device 10 according to an exemplary embodiment of the present general inventive concept includes an input unit 100, a mounting unit 200, and a hinge unit 300 containing a first hinge unit 300a and a second hinge unit 300b as illustrated in FIG. 3.

The input unit 100 is a unit to transmit a user command to a portable computing device 30, for example, a mobile device such as a tablet PC. The input unit 100 may be a keyboard including a keypad 110 or a keyboard including the keypad 110 and a touch pad 130. The input unit 100 may be a wired keyboard electrically connected to the portable computing device 30 through a predetermined cable (not illustrated), or a wireless keyboard to communicate with the portable computing device 30 through a wireless signal. When the input unit 100 is a wireless keyboard, the input unit 100 may communicate with the portable computing device in a Bluetooth communication manner or a WI-FI communication manner.

The mounting unit 200 forms a space portion 201 into which an end portion 31 of the portable computing device 30 is separably inserted. The mounting unit 200 includes a rear support part 210 to support a portion of a rear surface of the portable computing device 30, and a front support part 230 to support a portion of a front surface of the portable computing device 30. The mounting unit 200 includes a plurality of first guide protrusions 214 and a plurality of second guide protrusions 215 formed in a groove 213.

Figure 2:
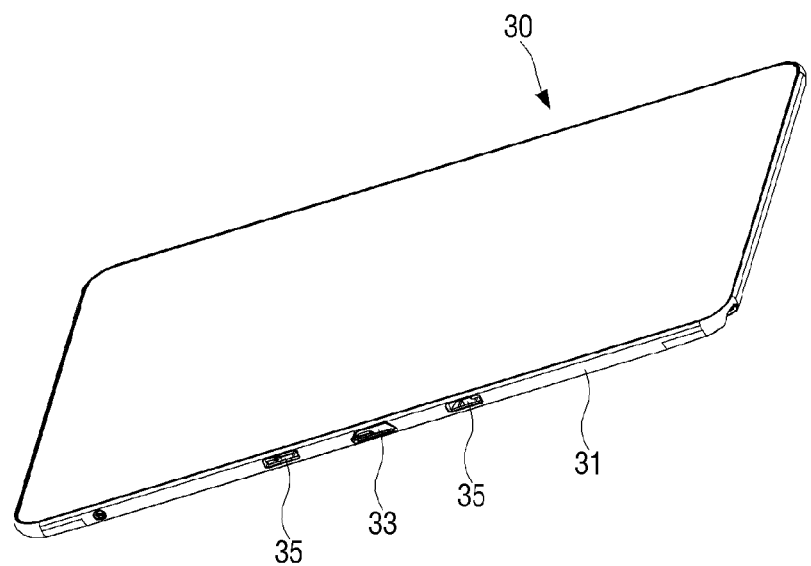
FIG. 2 is a perspective view illustrating the portable computing device of FIG. 1.

The mounting unit 200 may include a predetermined terminal part 250 illustrated in FIG. 3, to be electrically connected to a terminal part 33 illustrated in FIG. 2. The predetermined terminal part 250 of the mounting unit 200 may be electrically connected to an electronic circuit (not illustrated) of the input unit 100 through a flexible cable (not illustrated). When the portable computing device 30 is mounted on the mounting unit 200, a user command through the input unit 100 may be transmitted to the portable computing device 30, and power provided to the input unit 100 may be supplied to the portable computing device 30 and charge a battery (not illustrated) built in the portable computing device 30.

Figure 9:
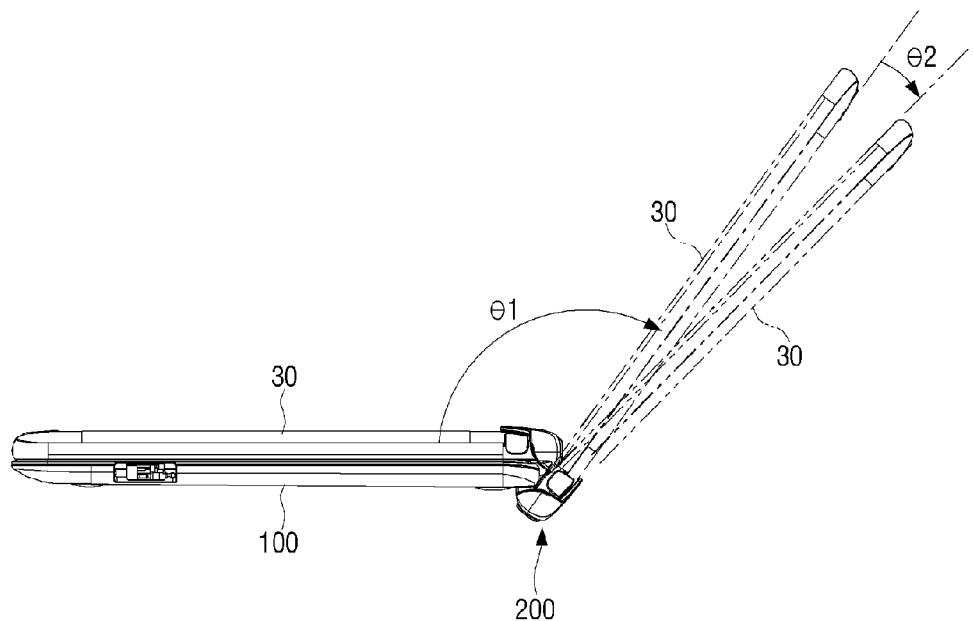
FIG. 9 is a side view illustrating an example in which a portable computing device mounted on a mounting unit rotates in a first angle range from an input unit, and an example in which the portable computing device rotates in a second angle range beyond an upper limit of the first angle range.

The mounting unit 200 may rotate to a first angle range $\theta 1$ or a second angle range $\theta 2$ using the hinge unit 300 as a rotation center, as illustrated in FIG. 9.

Referring to FIG. 9, the first angle range $\theta 1$ is an angle range from a location in which the portable computing device 30 mounted on the mounting unit 200 comes into contact with the input unit 100, when the portable computing device 30 is folded onto the input unit 100, to a predetermined angle when the portable computing device 30 rotates away from the input unit 100, for example, about 0 degree to about 125 degrees, but is not limited thereto. The second angle range $\theta 2$ may have a lower limit exceeding an upper limit of the first angle range $\theta 1$ and continuous until reach an upper limit of the second angle range $\theta 2$, for example, about 126 degrees to about 135 degrees, but is not limited thereto.

The first angle range $\theta 1$ is maintained in a state in which the portable computing device 30 is not detached from the mounting unit 200, and the second angle range $\theta 2$ is maintained in a state in which the portable computing device 30 is detachable from the mounting unit 200.

The first and second hinge units 300a and 300b interconnect the input unit 100 and the mounting unit 200, and are symmetrically disposed at a left end and a right end of the mounting unit 200, respectively. The first and second hinge units 300a and 300b have the same structure, and therefore, only the first hinge unit 300a will be described below.

Figure 4:
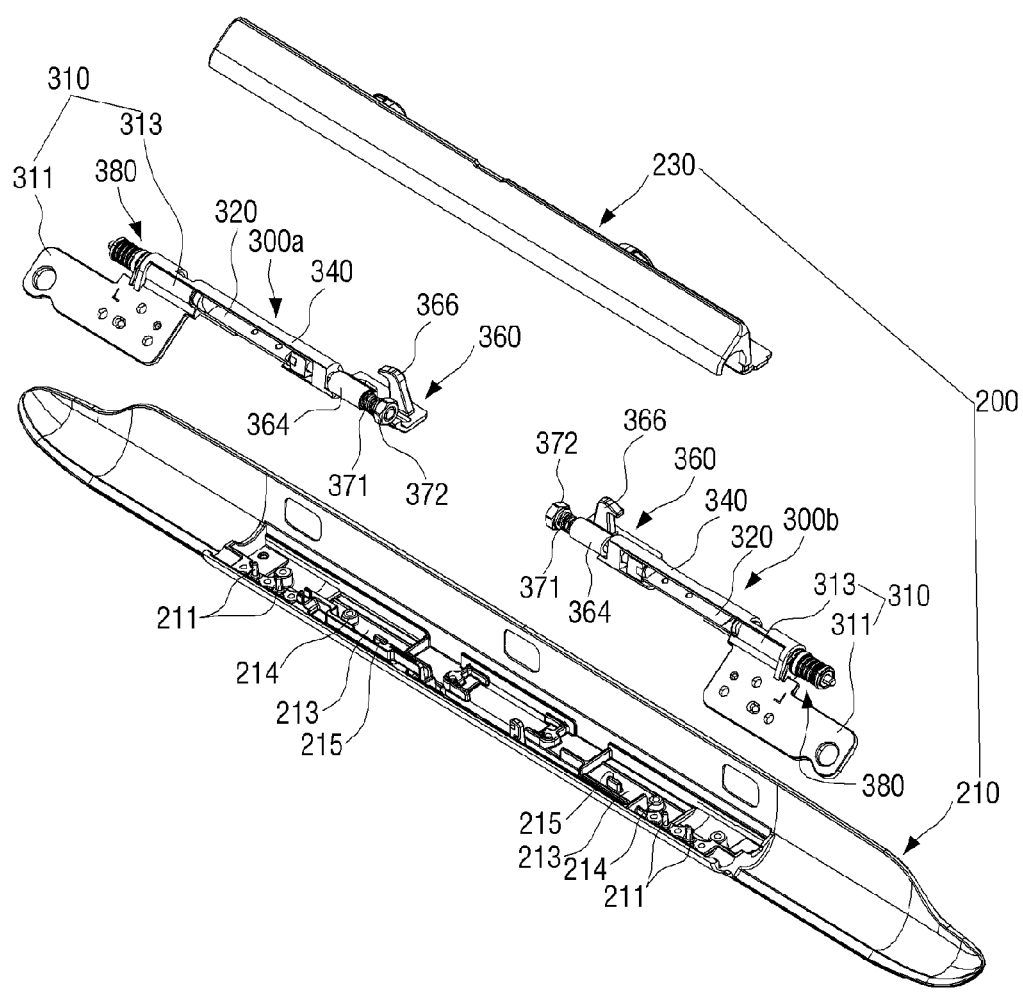
FIG. 4 is an exploded perspective view illustrating a mounting unit illustrated in FIG. 1.
Figure 5:
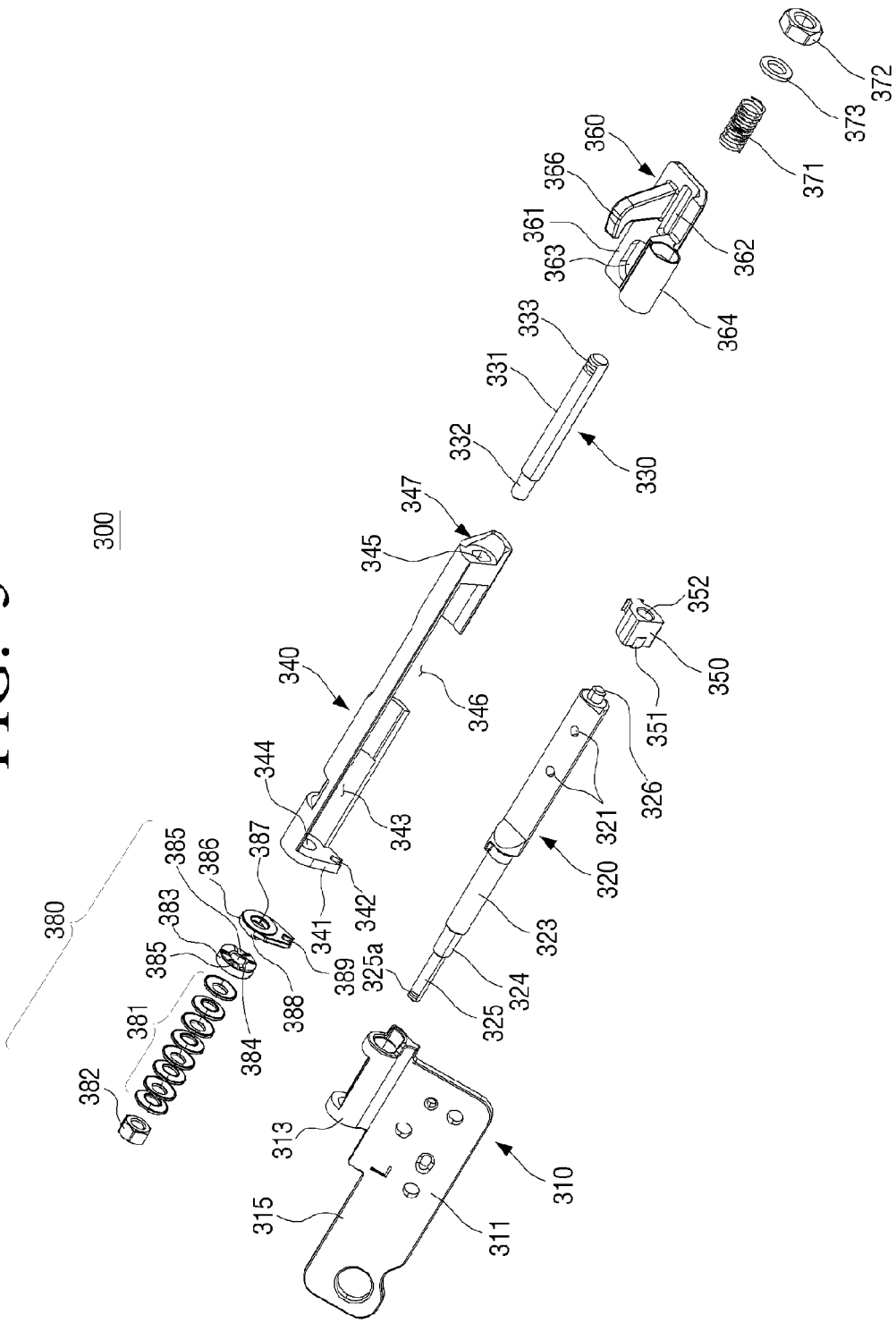
FIG. 5 is an exploded perspective view illustrating a first hinge unit illustrated in FIG. 4.

Referring to FIGS. 3 through 5, the first hinge unit 300a includes a fixing member 310, first and second hinge shafts 320 and 330, respectively, a connection member 340, a hooking part 360, and a pressing part 380.

A first side portion 311 of the fixing member 310 is fixed to an inner side of the input unit 100, and the first hinge shaft 320 is rotatably coupled to a second side portion 313 of the fixing member 310.

The first hinge shaft 320 is rotatably inserted into the connection member 340, and a plurality of fixing holes 321, into which a plurality of fixing protrusions 211 protruding in the rear support part 210 of the mounting unit 200 are inserted, are formed in the first hinge shaft 320. Therefore, the first hinge shaft 320 becomes a rotation center of the mounting unit 200, and at the same time, the first hinge shaft 320 is fixed to the mounting unit 200 and rotates with the mounting unit 200.

An end portion 323 of the first hinge shaft 320 penetrates the second side portion 313 of the fixing member 310 and is rotatably coupled to the second side portion 313 of the first member 310.

The connection member 340 is rotatably disposed in an inner side of the mounting unit 200 along a length direction of the mounting unit 200. An insertion groove 342 of a coupling protrusion 341 formed on one side of the connection member 340 is fixed and coupled to a side end portion 315 of the fixing member 310. Therefore, the connection member 340 is not interlocked with the rotation of the mounting unit 200, but instead maintains a fixing state to the input unit 100.

An insertion space 343, into which the first hinge shaft 320 is rotatably inserted, is formed in an inner side of the connection member 340. A first penetration hole 344, through which a first extension portion 324 extending from the end portion 323 of the first hinge shaft 320 passes is formed on one side of the connection member 340, and a second penetration hole 345, through which the second hinge shaft 330 passes, is formed on another side of the connection member 340.

The first penetration hole 344 is formed in a circular shape so that the first extension portion 324 of the first hinge shaft 320 is rotatable. Unlike the first penetration hole 344, the second penetration hole 345 is formed in a non-circular shape to correspond to a cross-sectional shape of an outer circumference 331 of the second hinge shaft 330, and thus the second hinge shaft 330 is coupled to the connection member 340 so that the second hinge shaft 330 is unable to rotate.

A cutting portion 346 is formed in the connection member 340, and the plurality of fixing protrusions 211 protruding in the rear support part 210 of the mounting unit 200 are inserted into the plurality of fixing holes 321 of the first hinge shaft 320 through the cutting portion 346.

A supporter 350 is inserted into the insertion space 343 of the connection member 340 together with the first hinge 320. The supporter 350 connects and at the same time rotatably supports the first hinge shaft 320 and the second hinge shaft 330, respectively. To this end, the supporter 350 includes a first groove 351, into which a supporting protrusion 326 of the first hinge shaft 320 is rotatably inserted, formed on one side of the supporter 350 close to the supporting protrusion 326, and a second groove 352, into which a supporting protrusion 332 of the second hinge shaft 330 is rotatably inserted, formed on the other side of the supporter 350.

Figure 7:
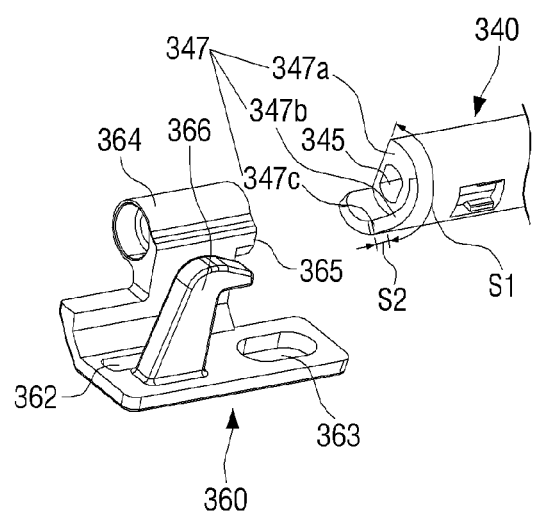
FIG. 7 is another perspective view illustrating a hooking part and a portion of a connection member illustrated in FIG. 4.
Figure 8:
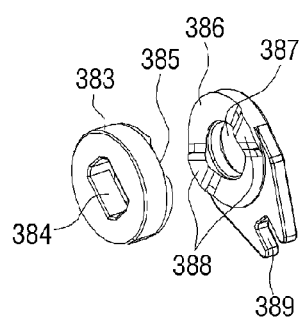
FIG. 8 is a perspective view illustrating first and second uneven parts of a pressing part illustrated in FIG. 5.

A cam surface 347 is formed on the another side of the connection member 340 to couple with the second hinge shaft 330. Referring to FIG. 7, the cam surface 347 may include a flat section portion 347a, a first curved section portion 347b, and a second curved section portion 347c. The first angle range $\theta 1$ corresponds to a first section S1 of the cam surface 347, that is, combination of the flat section portion 347a and the first curved section portion 347b, where the flat section portion 347a is continuous with the first curved section portion 347a. The second range angle $\theta 2$ corresponds to a second section S2 of the cam surface 347, that is, the second curved section portion 347c.

Figure 6:
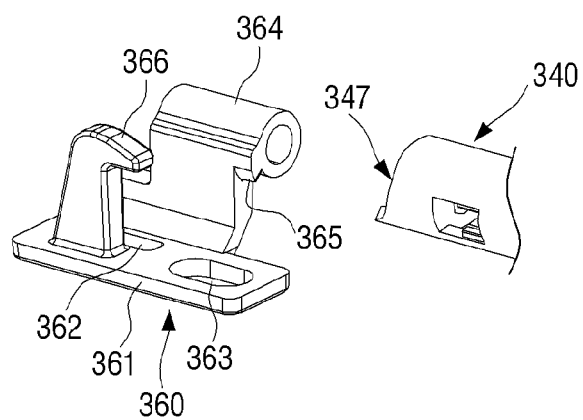
FIG. 6 is a perspective view illustrating a hooking part and a portion of a connection member illustrated in FIG. 4.

A cam protrusion 365 of the hooking part 360, as illustrated in FIGS. 6 and 7, is in cam contact with the cam surface 347 to slidably move. As the cam protrusion 365 is guided to the cam surface 347 illustrated in FIGS. 10A, 11A, and 12A, the hooking part 360 moves along an axial direction of the second hinge shaft 330 illustrated in FIGS. 10B, 11B, and 12B.

Referring to FIGS. 5 through 7, the hooking part 360 includes a plate portion 361, a first cutting portion 362, a second cutting portion 363, a coupling portion 364, the cam protrusion 365, and a hook 366.

The plate portion 361 is slidably placed in the groove 213, as illustrated in FIG. 4, which is formed in an inner circumferential surface of the rear support part 210 of the mounting unit 200. At this time, the plate portion 361 is guided by the first guide protrusion 214 and the second guide protrusion 215 formed in the groove 213. In this case, the first guide protrusion 214 is slidably coupled to the first cutting portion 362 formed on the plate portion 361, and the second guide protrusion 215 is slidably coupled to the second cutting portion 363.

The coupling portion 364 is formed to extend from one side of the plate portion 361, and is coupled to the second hinge shaft 330 to simultaneously slidably move and rotate along the second hinge shaft 330.

The cam protrusion 365 protrudes from one side of the coupling portion 364 to face the cam surface 347. At this time, the coupling portion 364 is elastically supported toward the connection member 340 by an elastic member 371 installed in the second hinge shaft 330. Accordingly, since the cam protrusion 365 closely contacts the cam surface 347 in a pressing state, and is not spaced away from the cam surface 347, the cam protrusion 365 slidably moves along the cam surface 347, when the hooking part 360 rotates together with the mounting unit 200.

At this time, a nut 372 fastened to a screw portion 333 of the second hinge shaft 330 may prevent the elastic member 371 from being deviated from the second hinge shaft 330. The reference numeral 373 denotes a washer.

The hook 366 is formed to protrude from one surface of the plate portion 361, and is selectively locked to or released from a locking groove 35, as illustrated in FIG. 2, which is formed in the end portion 31 of the portable computing device 30.

The pressing part 380 includes a plurality of spring washers 381 coupled to a second extension portion 325 extending from the first extension portion 324 of the second hinge shaft 320, a first uneven part 383 elastically supported by the plurality of spring washers 381 and rotating together with the first hinge shaft 320, and a second uneven part 386 having a coupling groove 389 formed on one side thereof to couple with the side end portion 315 of the fixing member 310. A nut 382 fastened to a screw portion 325a of the second extension portion 325 may prevent the plurality of spring washers 381 from being deviated from the second extension portion 325.

The first uneven part 383 has a groove 385 outside a first center hole 384, and the second uneven part 386 has a protrusion 388 outside a second center hole 387, respectively. The first center hole 384 and the second center hole 387 correspond to each other to receive the first hinge shaft 320. The first uneven part 383 and the second uneven part 386 can be uneven-coupled and uneven-released according to whether or not the groove 385 and the protrusion 388 is deviated from each other.

When the portable computing device 30 mounted on the mounting unit 200 is folded to the input unit 100, as illustrated in FIG. 9, the protrusion 388 is inserted into the groove 385, and a folded state of the portable computing device 30 to the input unit 100 is maintained. Further, when the portable computing device 30 rotates in the first and second angle ranges θ1 and θ2, respectively, to a direction in which the portable computing device 30 is spaced apart from the input unit 100, the protrusion 388 is deviated from the groove 385, and the first uneven part 383 is pressed to the second uneven part 386 by the plurality of spring washers 381 so that the portable computing device 30 may be maintained to a desired angle.

Hereinafter, an action of the portable computing device docking apparatus having the above-described configuration according to an exemplary embodiment of the present general inventive concept will be described with reference to FIGS. 9 through 12B.

When the portable computing device 30 is mounted on the mounting unit 200, the hooks 366 of the hooking part 360 included in the first and second hinge units 300a and 300b, respectively, are locked in a pair of locking grooves 35 of the portable computing devices 30.

Figure 10A:
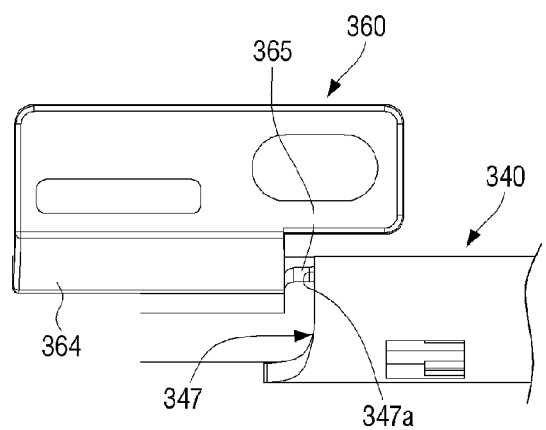
FIG. 10A is a view illustrating locations of a cam protrusion and a cam surface in a state in which the portable computing device is folded to the input unit as illustrated in FIG. 9.
Figure 10B:
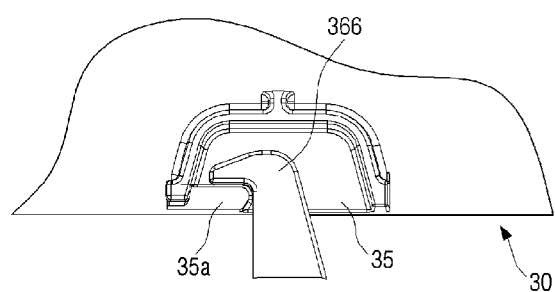
FIG. 10B is a view illustrating an example in which a hook is set to a locking location in a locking groove in a state in which the portable computing device is folded to the input unit as illustrated in FIG. 9.

When the portable computing device 30 mounted on the mounting unit 200 is folded to the input unit 100, the cam protrusion 365 is in contact with the flat section portion 347a of the cam surface 347, as illustrated in FIG. 10A, and the hook 366 is set to a locking location in the locking groove 35, as illustrated in FIG. 10B. At this time, the hook 366 is maintained not to be deviated from a locking protrusion 35a.

Figure 11A:
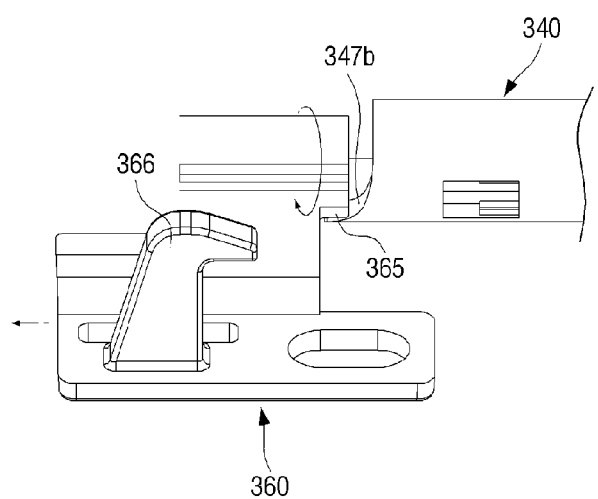
FIG. 11A is a view illustrating locations of a cam protrusion and a cam surface in a state in which the portable computing device is set to a first angle range as illustrated in FIG. 9.
Figure 11B:
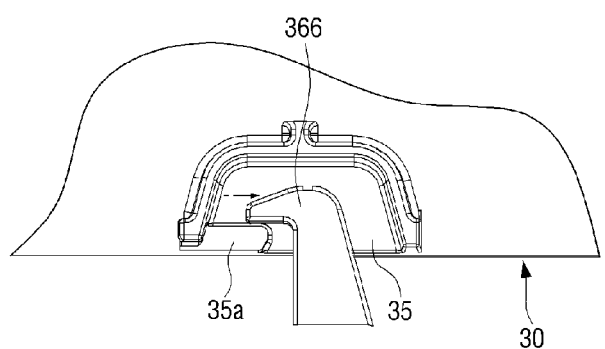
FIG. 11B is a view illustrating an example in which a hook is set to a locking location in a locking groove in a state in which the portable computing device is set to a first angle range as illustrated in FIG. 9.

When the portable computing device 30 rotates to an appropriate angle in the first angle range θ1 in order for the user to use the portable computing device 30, the cam protrusion 365 is in contact with the first curved section portion 347b of the cam surface 347, as illustrated in FIG. 11A, and the hook 366 is still set to the locking location in the locking groove 35, as illustrated in FIG. 11B. At this time, the hook 366 is still maintained not to be deviated from the locking protrusion 35a.

Figure 12A:
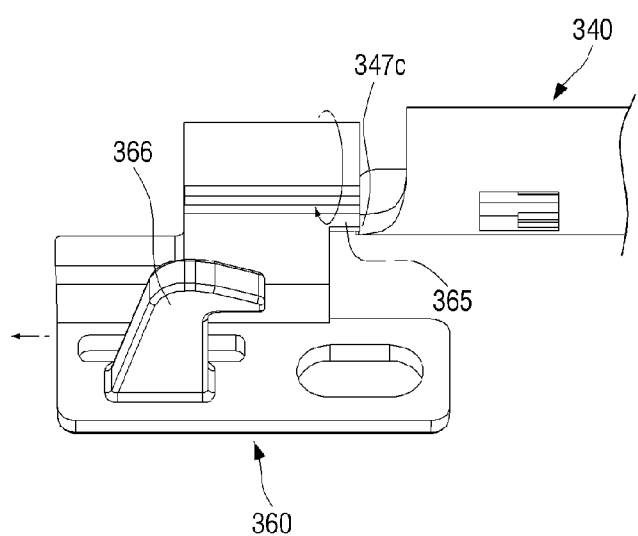
FIG. 12A is a view illustrating locations of a cam protrusion and a cam surface in a state in which the portable computing device is set to a second angle range as illustrated in FIG. 9.
Figure 12B:
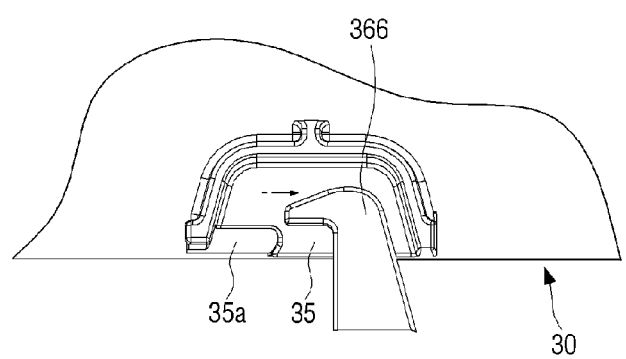
FIG. 12B is a view illustrating an example in which a hook is set to a locking release location in a locking groove in a state in which the portable computing device is set to a second angle range as illustrated in FIG. 9.

When the portable computing device 30 rotates to a direction exceeding the first angle range θ1 and is in the second angle range θ2 in order for the user to separate the portable computing device 30 from the mounting unit 200, the cam protrusion 365 is in contact with the second curved section portion 347c of the cam surface 347, as illustrated in FIG. 12A, and the hook 366 is set to a locking release location so that the hook 366 gets out of the locking protrusion 35a, and then is deviated from the locking protrusion 35, as illustrated in FIG. 12B.

According to the above-described exemplary embodiments of the present general inventive concept, the portable computing device 30 may be easily separated from the mounting unit 200 through a simple operation of rotating the portable computing device 30 to a direction away from the input unit 100, and moving the portable computing device 30 to an angle within the second angle range θ2.

Therefore, the portable computing device docking apparatus according to the exemplary embodiment of the present general inventive concept is convenient to use as compared to the related art having a separate structure, such as the conventional locking structure, through which the user has to press the button and operate the hook in order to separate the portable computing device from the mounting unit.

Although the exemplary embodiments of the present general inventive concept describe the portable computing device docking apparatus, the hinge unit 300 and the mounting unit 200 are not limited to connecting the input unit 100 and the computer device 30. In other words, the present general inventive concept also applies to other suitable devices that can be connected in a foldable manner through the hinge unit 300 and the mounting unit 200, such as a first body and a second body, which do not necessarily have a function of inputting a user command or serve as a computer device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computing device docking apparatus, comprising:
    an input unit to input a user command;
    a mounting unit disposed in one side of the input unit, and into which one end portion of a portable computing device is separately inserted; and
    a hinge unit to interconnect the input unit and the mounting unit, and selectively lock and release the portable computing device according to an angle formed by the portable computing device mounted on the mounting unit and the input unit, wherein the hinge unit locks the portable computing device when the mounting unit is set to rotate in a first angle range, and releases the locking of the portable computing device when the mounting unit is set to rotate in a second angle range exceeding an upper limit of the first angle range.

2. The docking apparatus as claimed in claim 1, wherein the hinge unit includes:
   a fixing member fixed to the input unit;
   a connection member fixed to the fixing member and having a cam surface formed in one end thereof;
   a first hinge shaft inserted into the connection member and rotatably connected to the input unit;
   a second hinge shaft disposed coaxially with the first hinge shaft and fixed to the connection member; and
   a hooking part including a cam protrusion in cam contact with the cam surface, and to rotate with the mounting unit and to slide along an axial direction of the second hinge shaft.

3. The docking apparatus as claimed in claim 2, wherein the hooking part includes a hook formed to be inserted into a locking groove of the portable computing device, and
   the hook is set to be located in the locking groove in the first angle range, and set to a detachable location from the locking groove in the second angle range.

4. The docking apparatus as claimed in claim 3, wherein the cam surface includes a first section corresponding to the first angle range, and a second section corresponding to the second angle range.

5. The docking apparatus as claimed in claim 3, wherein the hooking part is elastically supported to the second hinge shaft so that the cam protrusion is in close contact with the cam surface.

6. The docking apparatus as claimed in claim 3, wherein the mounting unit is rotatably connected to the hinge unit, and the mounting unit includes a rear support part and a front support part to respectively support a rear and a front of the portable computing device.

7. The docking apparatus as claimed in claim 6, wherein the hook part is slidably guided to the rear support part, and rotates with the rear support part.

8. The docking apparatus as claimed in 3, wherein the hinge unit further includes a pressing part to maintain a rotation angel of the mounting unit in one side thereof.

9. The docking apparatus as claimed in claim 8, wherein the pressing part includes:
   a plurality of elastic washers installed in the first hinge shaft;
   a first uneven part supported by the plurality of elastic washers, and to rotate with the first hinge shaft; and
   a second uneven part coupled to the fixing member and selectively mutually uneven-coupled to and uneven-released from the first uneven part.

10. The docking apparatus as claimed in claim 1, wherein the hinge unit is disposed in a left and right of the mounting unit in pairs.

11. The docking apparatus as claimed in claim 1, wherein the input unit is a keyboard.

12. A docking apparatus, comprising a first body;
   a second body detachably connected to the first body in a foldable manner such that an angle is formed between the first body and the second body; and
   a hinge unit disposed on the first body to selectively engage with the second body according to the angle formed between the first body and the second body,
   wherein the second body is mounted to the first body when the angle is within a first angle range, and is separated from the first body when the angle is within a second angle range.

13. The docking apparatus of claim 12, wherein a lower limit of the second angle range exceeds an upper limit of the first angle range.

14. The docking apparatus of claim 12, wherein the hinge unit comprises:
   a connection member in a fixed position with respect to the first body, the connection member containing a cam surface including a first section corresponding to the first angle range and a second section corresponding to the second angle range, wherein the first section and the second section are curved portions of the cam surface.

15. The docking apparatus of claim 12, further comprising:
   a mounting unit disposed on the first body to rotatably connect to the hinge unit and, according to the angle formed between the first body and the second body, to selectively receive the second body.

16. The docking apparatus of claim 12, wherein the hinge unit comprises:
   a hooking part including a hook to selectively insert into a locking groove of the second body according to the angle formed between the first body and the second body.

17. The docking apparatus of claim 16, wherein the hook of the hinge unit is inserted in the locking groove when the angle between the first body and the second body is within the first angle range, and is separated from the locking groove when the angle is within the second angle range.

18. The docking apparatus of claim 12, wherein the second body is detached from the first body when the angle exceeds a predetermined range.

* * * * *